(12) United States Patent
Firestone et al.

(10) Patent No.: US 7,084,898 B1
(45) Date of Patent: Aug. 1, 2006

(54) SYSTEM AND METHOD FOR PROVIDING VIDEO CONFERENCING SYNCHRONIZATION

(75) Inventors: Scott S. Firestone, Mountain View, CA (US); Walter R. Friedrich, Pleasanton, CA (US); Nermin M. Ismail, Mountain View, CA (US); Keith A. Lantz, Los Altos, CA (US); Shantanu Sarkar, San Jose, CA (US); Luke K. Surazski, Santa Clara, CA (US); Duanpei Wu, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 260 days.

(21) Appl. No.: 10/715,687

(22) Filed: Nov. 18, 2003

(51) Int. Cl.
*H04N 7/14* (2006.01)

(52) U.S. Cl. .............................. 348/14.09; 348/14.08; 348/14.12

(58) Field of Classification Search .. 348/14.01–14.09, 348/14.1, 14.11, 14.12, 14.13
See application file for complete search history.

(56) References Cited

U.S. PATENT DOCUMENTS

| | | | |
|---|---|---|---|
| 5,557,725 A | 9/1996 | Ansberry et al. | |
| 5,608,653 A | 3/1997 | Palmer et al. | |
| 5,642,171 A | 6/1997 | Baumgartner et al. | |
| 5,801,756 A | 9/1998 | Iizawa | |
| 5,818,514 A | 10/1998 | Duttweiler et al. | |
| 5,991,277 A | 11/1999 | Maeng et al. | |
| 6,008,838 A | 12/1999 | Iizawa | |
| 6,288,740 B1 | 9/2001 | Lai et al. | |
| 6,404,745 B1 | 6/2002 | O'Neil et al. | |
| 6,452,974 B1 | 9/2002 | Menon et al. | |
| 6,674,459 B1 * | 1/2004 | Ben-Shachar et al. ... | 348/14.09 |
| 2002/0191072 A1 | 12/2002 | Henrikson | |

FOREIGN PATENT DOCUMENTS

EP 987894 A2 * 3/2000

OTHER PUBLICATIONS

H. Schulzrinne, "RTP Profile for Audio and Video Conferences with Minimal Control", pp. 1-16, Jan. 1996.
H. Schulzrinne, "RTP: A Transport Protocol for Real-Time Applications", pp. 1-63, Jan. 1996.

* cited by examiner

*Primary Examiner*—Melur Ramakrishnaiah
(74) *Attorney, Agent, or Firm*—Baker Botts L.L.P.

(57) ABSTRACT

An audio mixer on a first device receives one or more incoming audio streams. Each of the one or more incoming audio streams has an associated timestamp. The audio mixer generates a mixed audio stream from the one or more incoming audio streams. The audio mixer determines differences in the time base of each of the one or more incoming audio streams and the time base for the mixed audio stream. The audio mixer generates mapping parameters associated with the determined differences and transforms the timestamp of each of the one or more incoming audio streams to a corresponding output timestamp associated with the mixed audio stream according to the mapping parameters. the mapping parameters are provided to a video mixer for similar processing and transformation such that the mixed audio stream is in synchronization with a mixed video stream.

20 Claims, 3 Drawing Sheets

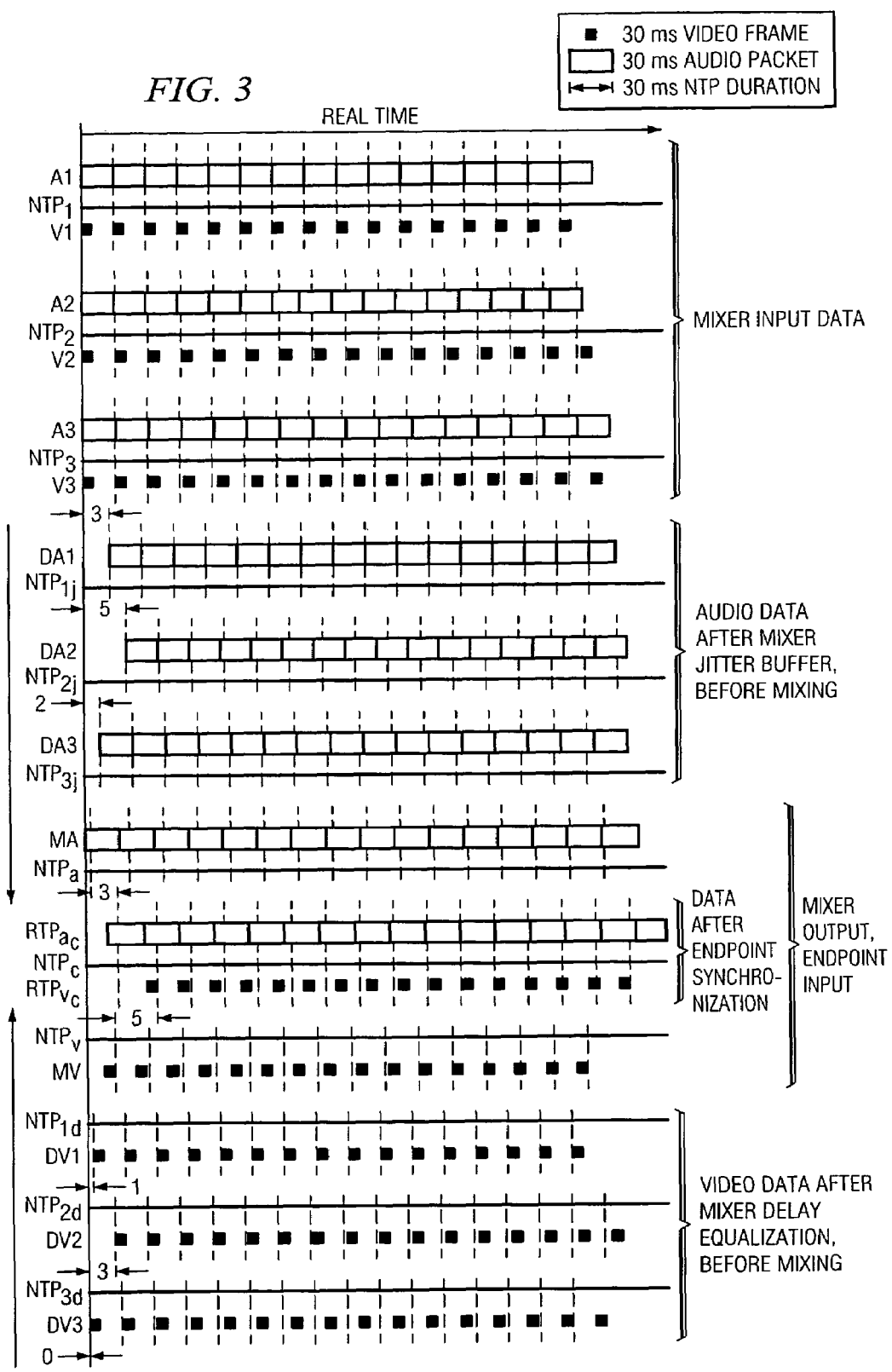

SYSTEM AND METHOD FOR PROVIDING VIDEO CONFERENCING SYNCHRONIZATION

TECHNICAL FIELD OF THE INVENTION

The present invention relates in general to telecommunications signal processing and more particularly to a system and method for providing video conferencing synchronization.

BACKGROUND OF THE INVENTION

Video conferences consisting of three or more participants generally use a multipoint control unit (MCU) to mix the audio streams and the video streams. The MCU is also referred to as a conference bridge and typically consists of a multipoint controller and one or more multipoint processors, which may be located on different network devices. The multipoint controller handles the call connection process in order to connect streams from endpoints to the multipoint processors. The multipoint processors perform the actual audio and video mixing. Each multipoint processor typically includes an audio mixer and a video mixer.

Each endpoint will typically send both its audio stream and its video stream to the same multipoint processor. The multipoint processor will typically send one audio stream and one video stream back to each endpoint. The audio mixer and the video mixer use the same time base when generating timestamps for the mixed audio and mixed video streams so that each endpoint can achieve lip synchronization between the mixed audio and video streams. In a conventional multipoint processor, the audio and video mixers run on processes within the same multipoint processor on a single network device and use a common time base provided by the network device. However, there is no mechanism to provide lip synchronization when the audio and video mixers are located on separate devices and/or geographically apart while operating from different time bases.

SUMMARY OF THE INVENTION

From the foregoing, it may be appreciated by those skilled in the art that a need has arisen to provide synchronization of audio and video streams in a video conference using audio and video mixers on separate devices having different time bases. In accordance with the present invention, a system and method for providing video conferencing synchronization are provided that substantially eliminate or greatly reduce disadvantages and problems associated with conventional video conferencing techniques.

According to an embodiment of the present invention, there is provided a system for providing video conferencing synchronization that includes an audio mixer on a first device operable to receive one or more incoming audio streams. Each of the one or more incoming audio streams has an associated timestamp. The audio mixer generates a mixed audio stream from the one or more incoming audio streams. The audio mixer determines differences in time bases between the one or more incoming audio streams and the mixed audio stream. The audio mixer generates mapping parameters associated with the determined differences and transforms the timestamp of each of the one or more incoming audio streams to a corresponding output timestamp associated with the mixed audio stream according to the mapping parameters. The mapping parameters are sent to a video mixer in order to appropriately transform timestamps for one or more incoming video streams to output timestamps of a mixed video stream and thus synchronize the audio and the video mix for the video conference.

The present invention provides various technical advantages. For example, one technical advantage is the ability to synchronize audio and video streams generated by separate mixers having different time bases. Another technical advantage is to be able to minimize the delay through the video mixer. Yet another technical advantage is the ability to coordinate communications between the audio mixer and the video mixer to achieve desired synchronization. Other technical advantages may be readily apparent to those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numbers represent like parts, in which:

FIG. 3 illustrates an example timing comparison associated with the streams processed in the video conferencing system.

DETAILED DESCRIPTION OF THE INVENTION

Figure 1:
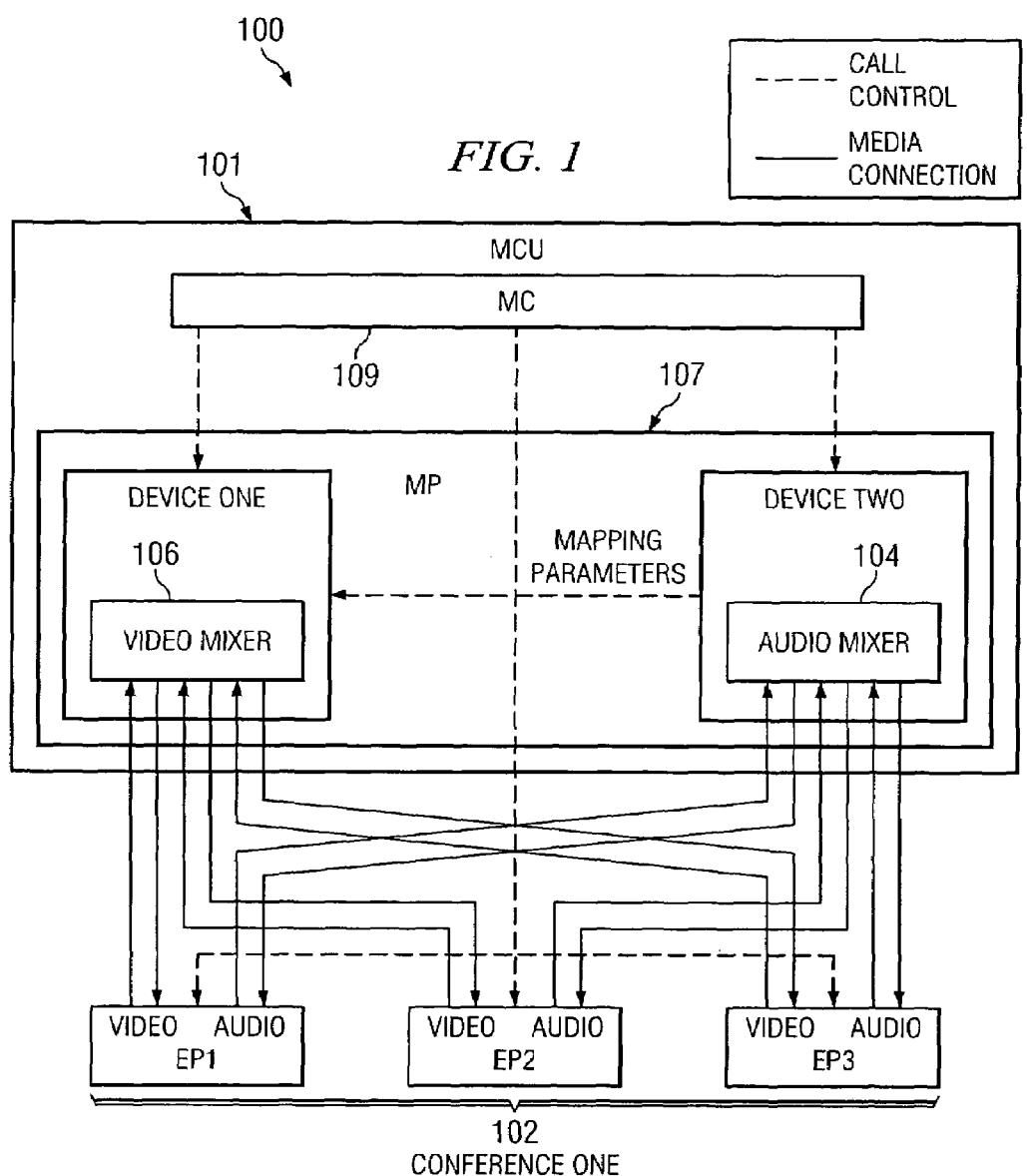
FIG. 1 illustrates a simplified block diagram of a video conferencing system.

FIG. 1 shows a block diagram of a system 100 for synchronizing video and audio streams. System 100 includes three sending endpoints 102 (EP1, EP2, and EP3) that generate audio and video streams for a MCU 101. MCU 101 includes an audio mixer 104 and a video mixer 106 as part of a multipoint processor 107 that provide a mixed audio and video stream respectively to a receiving endpoint 102 under supervision of a multipoint controller 109. The MC 109 and MP 107 may be located on separate physical devices, in which case MCU 101 is considered a virtual device. Receiving endpoint 102 may be one of the three sending endpoints or a different endpoint. Three endpoints are shown merely for discussion purposes as more or fewer endpoints may participate in the video conference. Audio mixer 104 and video mixer 106 are implemented on separate network devices, which may be located geographically remote from each other. Though on separate devices, audio mixer 104 and video mixer 106 create the functionality of a single virtual multipoint processor 107. Though not required, mixers for all related streams should be a part of multipoint processors 107 that are controlled by the same multipoint controller 109 to facilitate call control.

Figure 2:
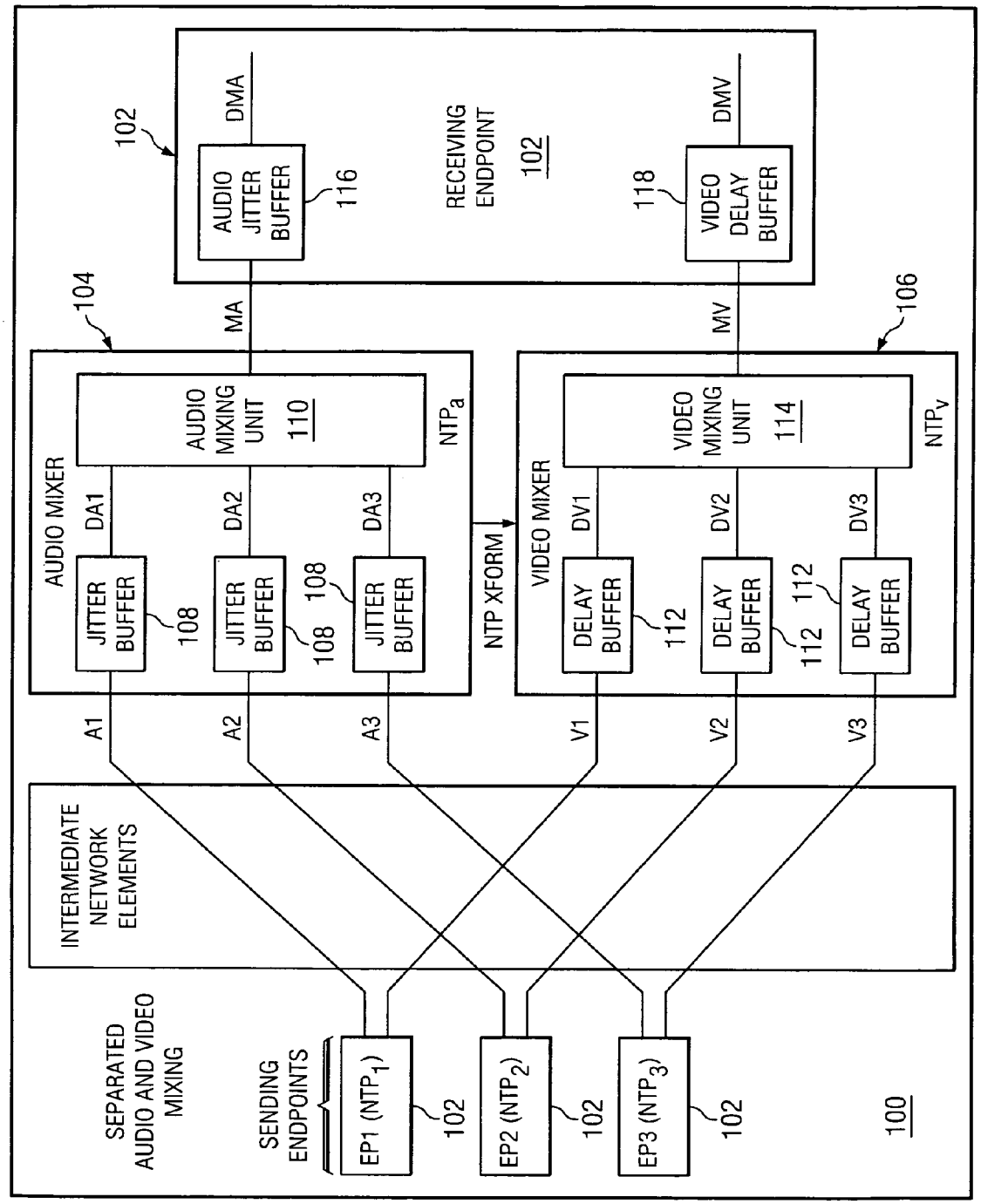
FIG. 2 illustrates a simplified diagram of stream processing within the video conferencing system.

FIG. 2 shows a simplified stream flow through system 100. Audio mixer 104 receives audio streams A1, A2, and A3 from respective endpoints EP1, EP2, and EP3. Audio streams A1, A2, and A3 are placed into respective jitter buffers 108 for delay purposes to create DA1, DA2, and DA3. Audio streams that have more jitter require a larger amount of delay. For example, audio stream A2 may have a relatively large amount of jitter and thus requires a larger amount of delay than audio stream A3 that has a relatively smaller amount of jitter. Though a jitter buffer is shown for each input audio stream, fewer or more jitter buffers may be implemented to receive the input audio streams. Audio mixer 104 removes data from jitter buffers 108 for appropriate summation. Removal of data from jitter buffers 108 may be periodic and performed at a constant bit rate or packet rate in order to facilitate traffic shaping.

Audio mixer 104 includes an audio mixing unit 110 that sums the delayed audio streams DA1, DA2, and DA3 to create a mixed audio stream MA. Audio mixing unit 110 may select all, one, some, or none of delayed audio streams DA1, DA2, and DA3. One selection example performed by audio mixing unit 110 may be to select the two loudest speakers from the three audio streams shown. Mixed audio stream MA is sent to each endpoint involved in the video conference. To avoid echo, mixed audio stream MA sent to a particular endpoint does not include the audio from that endpoint. Thus, audio mixing unit 110 generates a unique mixed audio stream for each endpoint that contributes to the audio mix. For endpoints that do not contribute to the audio mix, audio mixing unit 110 will generate a single mixed audio stream that may be copied for each endpoint not participating in the audio mix. Mixed audio stream MA sent to each endpoint dynamically changes in response to changes in the loudest speaker and changes in the endpoints participating in the audio mix. Speaker selection information may be provided by audio mixer 104 to video mixer 106 for use in creating the mixed video stream.

In operation, audio mixer 104 minimizes the amount of time that it takes to remove data from jitter buffers 108, perform summation, and transport mixed audio stream MA. Audio mixer 104 selects an average fullness level of jitter buffers 108 to be a minimum level to keep the probability of buffer underflow to an acceptable value. Mixed audio stream MA is generated by audio mixer 104 using timestamps derived from its own internal clock. The internal clock of audio mixer 104 might not be synchronized to the internal clocks of any of the endpoints. Moreover, each endpoint generally uses a clock that is not synchronized to the clock of any other endpoint. The real time sample rates of the input audio streams A1, A2, and A3 might be different if the sampling clocks at each endpoint are not derived from the same crystal oscillator. As such, audio mixer 104 resamples the input audio streams A1, A2, and A3 before adding them together. Resampling may only need to be performed as desired for those streams that are to be part of the audio mix.

Video mixer 106 receives video streams V1, V2, and V3 from participating endpoints EP1, EP2, and EP3. Each video stream includes one or more video images. Video images from the video streams V1, V2, and V3 are stored in one or more delay buffers 112. In order to synchronize video images with audio information, video streams V1, V2, and V3 are output from delay buffers 112 in accordance with mapping information received from audio mixer 104. Delayed video streams DV1, DV2, and DV3 are provided to a video mixing unit 114 in order to generate mixed video streams MV. Video mixer 106 selectively delays each video stream so that the skews among video streams in the mix match the relative skews between audio streams in the mix. However, achieving absolute synchronization may require further delaying either the video mixed stream or the audio mixed stream, depending on which mixed stream arrives at the endpoint first. For each mixed video stream, video mixing unit 114 creates a series of video images by tiling together the input video images from one or more participating endpoints 102. Video mixing unit 114 may optionally scale up or down any input video image or composed output video image of mixed video stream MV. The placement of input video images into mixed video stream MV is known as the video layout. The video layout is often determined by speaker selection information from audio mixer 104.

The receiving endpoint receives the mixed audio stream MA at an audio jitter buffer 116. Audio jitter buffer 116 performs a delay on the mixed audio stream MA to create delayed mixed audio stream DMA for presentation of the video conference at the receiving endpoint. The receiving endpoint also receives the mixed video stream MV at a video delay buffer 118. Video delay buffer 118 performs delay of the mixed video stream MV to create delayed mixed video stream DMV which is synchronized to delayed mixed audio stream DMA. Audio jitter buffer 116 and video delay buffer 118 account for arrival delay at the receiving endpoint, as well as the rendering delay through the endpoint.

When video mixer 106 creates mixed video stream MV including a single video image of the current speaker, that stream is known as a voice activated switched (VAS) stream. VAS streams often preserve the original resolution of the current speaker. A mixed video stream created by tiling together input video images from multiple source endpoints is known as a continuous presence (CP) stream. In a CP stream, each input video stream is typically scaled down before composing the associated mixed video stream, resulting in a loss of resolution. For a CP stream, a floor control policy determines which input video streams are included in the mixed video stream. Examples of the floor control policy for the mixed video stream include always showing a specific speaker, excluding certain participants, and switching between participants based on speaker selection determined by audio mixer 104. An example of always showing a specific speaker would be in relation to a lecture where the presenter is the center of attention. In addition, the position of these speakers in the video layout can be fixed to provide locked on participants. An example of specific participants to be excluded includes those that are listen only participants. An example of speaker selection includes selecting speakers that are the loudest or the recently loudest for display.

An example of a video conference using both VAS and CP streams may be a panel discussion with three panel participants and several audience participants. Each participant connects via an endpoint. Video mixer 106 would create a video layout having four participants each occupying a different quadrant. Three of the quadrants may be locked on to the panelists and the fourth quadrant can display a VAS stream that displays the loudest speaker from among the audience members. The floor control policy may be common to the video conference as a whole where all participants receive a mixed video stream with the same video layout. Alternatively, each endpoint may specify a different floor control policy where video mixer 106 creates a different video layout for each endpoint. A common feature is to provide a mixed video stream to a particular endpoint that does not include the input video stream from that endpoint. As a result, video mixer 106 generates a unique video mix for each endpoint that contributes to the video mix. For endpoints that do not contribute to the video mix, video mixer 106 may create a single mixed video stream that can be copied for these non-participating endpoints when they have a common floor control policy.

FIG. 3 shows an example timing comparison of the streams flowing in system 100. Endpoints EP1, EP2, and EP3 may operate with three different clocks—an audio sampling clock, a video sampling clock, and an internal network clock. In realistic terms, there is no synchronization between any of these clocks and there is no synchronization between clocks among the endpoints. This occurs because each clock is derived from a different crystal oscillator. Crystal oscillators typically have an accuracy of +/−100 parts per million and this deviation is enough to cause lip synchronization problems over a period of time if not appropriately corrected. Audio mixer 104 has its own audio sample clock and internal network clock (NTPa) that is not in synchronization with the audio sample clock and internal network clock (NTP1, NTP2, NTP3) of each endpoint 102. As a result, the delay for audio packets between being sent by an originating endpoint 102 and summed by audio mixer 104 is different for each endpoint 102. In addition, each audio stream is resampled by a different scale factor before summation.

To account for this relative delay, timestamps of audio packets from endpoints 102 will be transformed by an offset and scale factor into corresponding output timestamps in mixed audio stream MA. For each input audio stream, the timestamp mapping is as follows:

$$\text{mix\_TS} = M*\text{input\_TS} + B$$

where mix_TS is the adjusted timestamp of the input audio stream in the mixed audio stream.

M is the scale factor between the time base of the endpoint 102 and the time base of audio mixer 104, input_TS is the timestamp of the input audio stream, and B is the offset between the time base of the endpoint 102 and the time base of the audio mixer 104. M reflects the subtle difference in clock rate between the audio endpoint's sample clock and the audio mixer's sample clock. The value of M will be close to 1.0. For each input audio stream, audio mixer 104 will assign an input packet timestamp to a corresponding output timestamp. By observing the timestamp of the input packet and the timestamp of the assigned output mixed packet, audio mixer 104 establishes an input/output timestamp pair. Audio mixer 104 calculates parameters M and B by observing two sets of input/output timestamp pairs. For each input audio stream, audio mixer 104 attempts to maintain the offset and the scale factor as a constant. If there is a change in this relationship for an input audio stream, then a glitch might be heard on that audio stream's contribution to the audio mix unless the change is performed at a time when that input audio stream is silent. Audio mixer 104 may readjust the mapping in order to change the average jitter buffer level for an input audio stream.

Video mixer 106 generates timestamps for mixed video stream MV using a time base that is derived from the time domain used in audio mixer 104 to generate the audio timestamps. For each input video stream, video mixer 106 applies the same input to output mapping that was applied to the corresponding input audio stream in audio mixer 104. The input audio streams have relative delays with respect to each other in the summed audio mix and video mixer 106 matches these relative delays for the video mix. In order to achieve this match, audio mixer 104 communicates the M and B timestamp mappings for each input audio stream to video mixer 106.

The M and B parameters for each input audio stream may change to compensate for temperature fluctuations and jitter buffer adjustments. Temperature fluctuations may change the frequency of either the crystal clock in audio mixer 104 or the crystal clock in any of endpoints 102. A change in the clock frequency of an endpoint 102 relative to the clock frequency of audio mixer 104 will change the M and B parameter mapping. In this situation, the M and B parameters will change slowly over time. Based on this gradual change, audio mixer 104 may send the M and B parameters to video mixer 106 using an unreliable transmission channel. An example of an unreliable transmission channel includes sending RTCP packets over UDP. For this purpose, RTCP offers the application-specific APP RTCP packet type that can be used to contain application-specific data. For adjustments to the jitter buffers in audio mixer 104, video mixer 106 should preferably receive changes to the M and B parameters immediately. As a result, a reliable transmission protocol should be used to send this change. Synchronization may be lost and audio and video may be out of sync if the M and B parameters are lost or not immediately communicated. Regardless of the transmission method employed, audio mixer 104 indicates the time, as measured in the output time base, which the change in M and B parameters occurs. Video mixer 106 will then apply the new M and B parameters at the appropriate time. Audio mixer 104 may transmit current speaker information to video mixer 106 with the M and B parameters. Current speaker information is preferably transmitted in real time using a reliable communication protocol in order to minimize video switching delay.

If all devices and endpoints use a common synchronized time base for all clocks, then M parameters are not needed. However, B parameters are still required in a typical audio bridge which attempts to minimize delay by mixing audio streams immediately after each stream exits a jitter buffer. Even with a synchronized time base, each stream may experience a different delay from endpoint to jitter buffer output, and each of these relative delays must be communicated with a B parameter.

Video mixer 106 determines its output frame rate and assembles frames together from each of the selected input video streams. If an output frame has a timestamp mix_TS, then for each input video stream, video mixer 106 selects a video frame with a timestamp that is closest to the theoretical value input_TS according to the following:

$$\text{input\_TS} = (\text{mix\_TS} - B)/M$$

For each input video stream, values of input_TS essentially sample the input video stream in the time domain. If the video output frame rate is greater than the frame rate of an endpoint, then a frame from that endpoint may be duplicated in multiple consecutive output frames. Likewise, if the video output frame rate is less than the frame rate of an endpoint, then a frame from that endpoint may be skipped when generating video for mixed video stream MV.

Video mixer 106 will add delay for video streams that arrive at the mixer earlier than corresponding data from other input video streams. This will allow input video streams that arrive at the mixer early to be buffered in order to wait for input video streams that arrive late. Video mixer 106 determines the necessary buffer delay for each input video stream by observing the timestamps of video packets as they arrive at the mixer. Each of these timestamps is appropriately matched to the output time base. Video mixer 106 then compares these timestamps. For each instant of time, video streams may arrive with different mapped output timestamps. In this case, one of the input video streams will arrive later than any other input video stream. For each remaining input video stream, the amount of additional buffer time for that input video stream is equal to the amount of time that input video stream arrives earlier than the most delayed input video stream.

In video mixer 106, the time domain used to create video output timestamps is the same as the time domain used by audio mixer 104 for audio output timestamps. Thus, video mixer 106 need not use its own clock to create output timestamps as it can determine the theoretical timestamp for each generated frame. In this manner, video mixer 106 implicitly uses the clock in audio mixer 104 rather than an on-board clock to create a synchronized mixed video output stream. Video mixer 106 may use its clock to perform traffic shaping to maintain constant frame rate, packet rate, or bit rate. If video mixer 106 does not need to perform traffic shaping, it can calculate the desired timestamp of the output frame, wait until all necessary input frames are received, and compose the output frame for transmission without waiting. If endpoints use timestamps for synchronization, then video mixer does not need to match the absolute delays between the mixed audio stream and the mixed video stream. Video mixer 106 would match only the relative delays among input video streams. If additional delay is required on the mixed video stream or the mixed audio stream, that delay can be performed at the endpoint receiving the mixed video and mixed audio.

Some endpoints 102 implement "poor man's lip synchronization" and do not observe timestamps. These endpoints assume that corresponding packets of audio and video arrive at the endpoint at the same time. In this situation, video mixer 106 matches absolute delays. To do this, video mixer 106 and audio mixer 104 are synchronized to a common time server and send mixed data onto the network at server times corresponding to the timestamps of the data. Either audio mixer 104 and video mixer 106 include extra delay capabilities so that packets are sent onto the network at the same time as corresponding packets from the other mixer. Audio mixer 104 and video mixer 106 communicate with each other to determine which mixer is to add delay to a mixed output stream. For each endpoint 102, audio mixer 104 and video mixer 106 may be required to match the necessary delay from each mixer all the way to the endpoint, taking into account the delay due to intermediate network devices and transcoders. This will ensure that packets of audio and video arrive at the destination endpoint at the same time.

For source endpoints having poor man's lip synchronization, packets of audio and corresponding video are placed onto the network at the same time. Audio mixer 104 and video mixer 106 are synchronized to a common time server and timestamps are assigned based on the moment that a packet is sent by a source endpoint. The mixers assign these timestamps based on the packet arrival time at the mixers, adjusted by any delays in each path such as transcoder delays.

When supporting endpoints that use poor man's lip synchronization, a communication technique is implemented between audio mixer 104 and video mixer 106 in order to match delays between endpoint senders and the mixers (for endpoints that send using poor man's lip synchronization) and between the mixers and endpoint receivers (for endpoints that receive using poor man's lip synchronization). Since this delay information changes very slowly, the communication technique used for this purpose can be the same as used to transmit the M and B parameters to compensate for temperature induced drift in time bases.

In one embodiment, the present invention can be used in a system that utilizes Real Time Protocol (RTP), a packetization protocol for streaming media. Each RTP packet stream includes one type of media, audio or video. Two types of timestamps are used, RTP timestamps and Network Time Protocol (NTP) timestamps. Each RTP packet includes an RTP timestamp. RTP audio timestamps use a clock that is the same as the audio sample rate and RTP video timestamps use a fixed rate. The capture clock for an audio stream is used as the audio RTP clock. The RTP timestamps from two different media streams coming from the same endpoint 102 are not directly correlated to each other because they are not in the same timebase. Thus, RTP timestamps cannot be directly used to synchronize audio and video streams from the same endpoint 102. RTP timestamps for a media stream are derived from the sample clock for that media. Sample clocks for different media on the same endpoint are not necessarily synchronized. Thus, the RTP timestamps for different streams from the same endpoint may also not be synchronized. Also, the NTP clock used by an endpoint may not be synchronized to any RTP clock.

To perform synchronization, the RTP timestamps are transformed to NTP timestamps. Each endpoint 102 has a single NTP timebase that is used for all streams generated by that particular endpoint 102. NTP timestamps can be used to synchronize multiple streams from a single endpoint 102. Information used to perform the transformation from RTP timestamps to NTP timestamps is sent for each stream in RTP Control Protocol (RTCP) packets. A RTCP sender report includes a RTP/NTP timestamp pair for that stream to allow the receiver to determine the relationship between RTP timestamps and NTP timestamps for that stream. The receiving endpoint can then synchronize the audio and video streams in the NTP time domain using the NTP timestamps. Based on this premise, audio mixer 104 sends to video mixer 106 a mapping between the NTP time base of each individual audio stream and the NTP time base of the mixed audio stream.

For mixers, RTP establishes a requirement that each output stream from the mixer has a unique Synchronization Source (SSRC) identifier. Streams that will be synchronized to each other are given the same canonical name (CNAME) in order to keep track of participants. Each mixed video stream will have the same CNAME as its corresponding mixed audio stream. To avoid loop detection problems, the mixer includes SSRC identifiers of each contributing source in a contributing source (CSRC) identifier list following the fixed RTP header of each RTP packet, forwards CNAME source description (SDES) packets from contributing sources in RTCP packets, and forwards BYE packets from contributing sources. If multiple mixers are used in parallel, then different RTP port numbers are implemented for each mixer output in order to avoid problems with SSRC collision detection.

When applied to RTP, the present invention is implemented with respect to the NTP timestamps. The M and B parameters for each input stream describe how the NTP timestamps of the input streams are transformed into NTP timestamps of the mixed stream. Mixers can use any RTP clock as long as the RTP timestamps are synchronized to the sample rate of the output media and RTCP packets are used with information that associates the RTP timestamps with the NTP timestamps.

Any one of the endpoints 102 may use voice activity detection (VAD), in which case audio data is not sent if the speaker is not speaking. If a participant joins a conference and sends video without initially sending audio packets, the audio mixer can estimate parameters for M and B by using the RTP/NTP pairs received in RTCP packets, which will generally be sent by the endpoint for the audio stream, even when VAD is used. After M and B parameters are estimated or calculated by the audio mixer, the video from that endpoint will appear continually synchronized in the video mix, even when the speaker from that endpoint stops and then resumes talking.

Video mixer 106 may pass one of the input video streams directly to an endpoint 102 with no mixing. This scenario may arise if the endpoint requests a video stream containing video from a single participant. This single video stream may be in addition to other video streams that the endpoint 102 receives. Video mixer 106 still applies the M and B parameter mapping to the timestamps of the single video stream so that the single video stream is synchronized to the mixed audio stream.

Any endpoint may use its own video mixer, either in place of the external video mixer or in addition to the external video mixer. A video mixer residing inside an endpoint 102 performs the M and B parameter mapping functionality as described above in order for the video stream to be synchronized to the mixed audio stream. If a destination endpoint chooses to display only a single video stream directly from a source endpoint, the destination endpoint performs the M and B mapping to synchronize that video stream to the mixed audio stream.

Though not recommended, cascaded audio mixers may be implemented. A single root mixer is designated as the output mixer, which may be fed by a second level of audio mixers, which may be fed by a third level of audio mixers, and so forth. Each endpoint is considered a leaf in the cascade. Each audio mixer in the cascade sends its M and B parameters to the next higher audio mixer in the cascade rather than to the video mixer. If an input to an audio mixer is fed by a mixer at a lower level in the cascade, the M and B parameters for the input audio mixer being fed are applied to the M and B parameters of each input of the lower audio mixer to create composite M and B parameters. The audio mixer then feeds the composite M and B parameters, as well as the M and B parameters for audio streams fed by leaf endpoints to the next higher level audio mixer. The root mixer creates end-to-end M and B parameters that map each leaf input of the mixer cascade to the mixed output audio stream and sends these composite M and B parameters to the video mixer. Speaker selection information is also transmitted through the cascade and indicates the volume of each leaf audio endpoint. The root audio mixer will then determine the loudest speaker from the volume information of each contributing endpoint. Cascaded audio mixers are not recommended due to the introduction of delay at each level of the cascade from the audio mixer jitter buffers. Cascaded audio mixers may establish a single virtual audio mixer for the purpose of combining timebase mapping processes of each individual audio mixer and for combining speaker selection information.

For cascaded video mixers, a single root video mixer is designated as the output mixer, which is fed by a second level of video mixers, each of which may in turn be fed by a third level of video mixers. Each video mixer performs timebase mapping using M and B parameters from the output audio mixer. A video stream from a lower level mixer in the cascade has a one to one mapping between its timestamps and the audio mixer output timestamps. A video mixer is provided information indicating that a video stream comes from a lower level video mixer. A single virtual video mixer may be created for the purpose of combining timebase mapping processes of each individual video mixer. Some video conferencing topologies may require that different endpoints receive audio from different audio mixers. In this topology, each audio mixer operates in parallel independently of the other audio mixers. There may be no correlation between sets of M and B parameters for any two audio mixers. For this topology, each audio mixer is paired with a separate video mixer. For multiple video mixers, it is advantageous for all of the video mixers to reside in a single multipoint processor to minimize the number of timebase communication paths that are established from the audio mixer.

In summary, an audio mixer determines mapping parameters that represent the differences in time bases of the endpoints generating the audio and video stream and the audio mixer generating the mixed audio stream. The mapping parameters are provided by the audio mixer to the video mixer so that the video mixer can also account for the differences in time bases to allow the audio for a video conference to be synchronized with the video associated therewith. The determination of delays and differences in time bases may be performed in hardware and/or through one or more software modules executing in the audio mixer. In this manner, lip synchronization can be achieved for a video conference despite using an audio mixer and a video mixer on separate devices with different operating clocks.

Thus, it is apparent that there has been provided, in accordance with the present invention, a system and method for providing video conferencing that satisfies the advantages set forth above. Although the present invention has been described in detail, it should be understood that various changes, substitutions, and alterations may be readily ascertainable by those skilled in the art and may be made herein without departing from the spirit and scope of the present invention as defined in the following claims. Moreover, the present invention is not intended to be limited in any way by any statement made herein that is not otherwise reflected in the following claims.

What is claimed is:

1. A system for providing video conferencing synchronization, comprising:
an audio mixer on a first device operable to receive one or more incoming audio streams, each of the one or more incoming audio streams having an associated timestamp, the audio mixer operable to generate a mixed audio stream from the one or more incoming audio streams, the audio mixer operable to determine differences in the time base of each of the one or more incoming audio streams and the time base for the mixed audio stream, the audio mixer operable to generate mapping parameters associated with the determined differences, the audio mixer operable to transform the timestamp of each of the one or more incoming audio streams to a corresponding output timestamp associated with the mixed audio stream according to the mapping parameters;
a video mixer on a second device operable to receive one or more incoming video streams, each of the one or more incoming video streams having an associated timestamp, the video mixer operable to generate a mixed video stream from the one or more incoming video streams, the video mixer operable to receive the mapping parameters from the audio mixer, the video mixer operable to transform the timestamp of each of the one or more incoming video streams to a corresponding output timestamp associated with the mixed video stream according to the mapping parameters.

2. The system of claim 1, further comprising:
an endpoint operable to receive the mixed audio stream from the audio mixer and the mixed video stream from the video mixer, the endpoint operable to synchronize the mixed audio stream and the mixed video stream according to their respective output timestamps.

3. The system of claim 1, wherein the audio mixer is operable to determine when the mapping parameters are to be applied.

4. The system of claim 1, wherein the video mixer is operable to receive speaker selection information with the mapping parameters from the audio mixer.

5. The system of claim 1, wherein the mapping parameters include an offset and a scale factor, the offset and scale factor representing differences in time bases of the one or more incoming audio streams and the mixed audio stream.

6. A method for providing video conferencing synchronization, comprising:
    receiving one or more incoming audio streams, each of the one or more incoming audio streams being associated with endpoint local timestamps;
    converting the endpoint local timestamps to endpoint network timestamps for each of the one or more incoming audio streams;
    generating a mixed audio stream from the one or more incoming audio streams, the mixed audio stream having mixer network timestamps;
    determining mapping parameters associated with each incoming audio stream between the endpoint network timestamps and the mixer network timestamps.

7. The method of claim 6, further comprising:
    receiving information indicating a relationship between the endpoint local timestamps and the endpoint network timestamps for each of the one or more incoming audio streams.

8. The method of claim 6, further comprising:
    adjusting the mapping parameters in response to a change in average jitter buffer levels associated with each one of the incoming audio streams.

9. The method of claim 6, further comprising:
    providing the mapping parameters to video stream processing in order to synchronize the mixed audio stream to an associated mixed video stream.

10. A method for providing video conferencing synchronization, comprising:
    receiving one or more incoming audio streams, each of the one or more incoming audio streams being associated with endpoint local timestamps;
    converting the endpoint local timestamps to endpoint network timestamps for each of the one or more incoming audio streams;
    generating a mixed audio stream from the one or more incoming audio streams, the mixed audio stream having mixer network timestamps;
    determining mapping parameters between the endpoint network timestamps and the mixer network timestamps;
    comparing two sets of endpoint network timestamps to mixer network timestamps;
    identifying an offset and a scale factor as the mapping parameters in response to timestamp comparison.

11. A system for providing video conferencing synchronization, comprising:
    means for receiving one or more incoming audio streams, each of the one or more incoming audio streams being associated with endpoint local timestamps;
    means for converting the endpoint local timestamps to endpoint network timestamps for each of the one or more incoming audio streams;
    means for generating a mixed audio stream from the one or more incoming audio streams, the mixed audio stream having mixer network timestamps;
    means for determining mapping parameters associated with each incoming audio stream between the endpoint network timestamps and the mixer network timestamps.

12. The system of claim 11, further comprising:
    means for receiving information indicating a relationship between the endpoint local timestamps and the endpoint network timestamps for each of the one or more incoming audio streams.

13. The system of claim 11, further comprising:
    means for adjusting the mapping parameters in response to a change in average jitter buffer levels associated with each one of the incoming audio streams.

14. The method of claim 11, further comprising:
    means for providing the mapping parameters to video stream processing in order to synchronize the mixed audio stream to an associated mixed video stream.

15. A system for providing video conferencing synchronization, comprising:
    means for receiving one or more incoming audio streams, each of the one or more incoming audio streams being associated with endpoint local timestamps;
    means for converting the endpoint local timestamps to endpoint network timestamps for each of the one or more incoming audio streams;
    means for generating a mixed audio stream from the one or more incoming audio streams, the mixed audio stream having mixer network timestamps;
    means for determining mapping parameters between the endpoint network timestamps and the mixer network timestamps;
    means for comparing two sets of endpoint network timestamps to mixer network timestamps;
    means for identifying an offset and a scale factor as the mapping parameters in response to timestamp comparison.

16. A computer readable medium including code for providing video conferencing synchronization, the code operable to:
    receive one or more incoming audio streams, each of the one or more incoming audio streams being associated with endpoint local timestamps;
    convert the endpoint local timestamps to endpoint network timestamps for each of the one or more incoming audio streams;
    generate a mixed audio stream from the one or more incoming audio streams, the mixed audio stream having mixer network timestamps;
    determine mapping parameters associated with each incoming audio stream between the endpoint network timestamps and the mixer network timestamps.

17. The computer readable medium of claim 16, wherein the code is further operable to:
    receive information indicating a relationship between the endpoint local timestamps and the endpoint network timestamps for each of the one or more incoming audio streams.

18. The computer readable medium of claim 16, wherein the code is further operable to:
    adjust the mapping parameters in response to a change in average jitter buffer levels associated with each one of the incoming audio streams.

19. The computer readable medium of claim 16, wherein the code is further operable to:

provide the mapping parameters to video stream processing in order to synchronize the mixed audio stream to an associated mixed video stream.

20. A computer readable medium including code for providing video conferencing synchronization, the code operable to:

receive one or more incoming audio streams, each of the one or more incoming audio streams being associated with endpoint local timestamps;

convert the endpoint local timestamps to endpoint network timestamps for each of the one or more incoming audio streams;

generate a mixed audio stream from the one or more incoming audio streams, the mixed audio stream having mixer network timestamps;

determine mapping parameters between the endpoint network timestamps and the mixer network timestamps;

compare two sets of endpoint network timestamps to mixer network timestamps;

identify an offset and a scale factor as the mapping parameters in response to timestamp comparison.

* * * * *